United States Patent
Dahl et al.

(10) Patent No.: US 11,473,558 B2
(45) Date of Patent: Oct. 18, 2022

(54) ACTUATING DRIVE FOR ADJUSTING THE PITCH ANGLE OF A ROTOR BLADE OF A WIND TURBINE, AND WIND TURBINE COMPRISING SUCH AN ACTUATING DRIVE

(71) Applicant: Liebherr-Components Biberach GmbH, Biberach an der Riss (DE)

(72) Inventors: Martin Dahl, Wettingen (CH); Stephan Kreiner, Ulm (DE); Marcel Winkler, Mindelheim (DE); Markus Schuster, Ottobeuren (DE); Christopher Fingerhut, Biberach an der Riss (DE); Thomas Schulze, Schemmerhofen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 17/032,902

(22) Filed: Sep. 25, 2020

(65) Prior Publication Data

US 2021/0033064 A1    Feb. 4, 2021

Related U.S. Application Data

(63) Continuation of application No. PCT/EP2019/055718, filed on Mar. 7, 2019.

(30) Foreign Application Priority Data

Mar. 26, 2018 (DE) ..................... 10 2018 107 172.8

(51) Int. Cl.
*F03D 7/02* (2006.01)
*F03D 80/70* (2016.01)
*F03D 1/06* (2006.01)

(52) U.S. Cl.
CPC ......... *F03D 7/0224* (2013.01); *F03D 1/0658* (2013.01); *F03D 80/70* (2016.05);
(Continued)

(58) Field of Classification Search
CPC ...... F03D 7/0224; F03D 80/70; F03D 1/0658; F05B 2260/79; F05B 2270/328
See application file for complete search history.

(56) References Cited

U.S. PATENT DOCUMENTS 2,954,830 A    10/1960    Gehres
2009/0175724 A1*   7/2009   Russ ................... F03D 1/0658
                                                    416/131
(Continued)

FOREIGN PATENT DOCUMENTS

DE          19948997 B4        4/2005
DE        102005026141         12/2006
(Continued)

*Primary Examiner* — Sean Gugger
(74) *Attorney, Agent, or Firm* — Levine Bagade Han LLP

(57) ABSTRACT

In general, the invention relates to wind turbines, the rotor blades of which can be adjusted in terms of their pitch angle. The invention relates in particular to an actuating drive for adjusting the pitch angle of a rotor blade of a wind turbine, comprising a large rolling bearing which comprises two bearing rings that can be rotated relative to each other, and an actuator for rotating the two bearing rings relative to each other. According to the invention, the actuating drive comprises a ring channel cylinder, which is formed in one of the bearing rings, and at least one piston, which is received in the ring channel cylinder in a movable manner and is drivingly connected to the other bearing ring of the two bearing rings.

12 Claims, 4 Drawing Sheets

(52) U.S. Cl.
CPC ....... *F05B 2240/54* (2013.01); *F05B 2240/57* (2013.01); *F05B 2260/79* (2013.01); *F05B 2270/328* (2013.01)

(56) References Cited

U.S. PATENT DOCUMENTS

2011/0187104 A1\* 8/2011 Numajiri ............... F03D 7/0224
  290/44
2014/0056709 A1\* 2/2014 Betran Palomas ... F03D 7/0224
  416/174

FOREIGN PATENT DOCUMENTS

| | | |
|---|---|---|
| DE | 102010010639 | 9/2011 |
| DE | 102013206878 | 10/2013 |
| DE | 102015004349 | 9/2016 |
| WO | WO 2015/090655 | 6/2015 |
| WO | WO 2017/025343 | 2/2017 |
| WO | WO 2019/185323 | 10/2019 |

\* cited by examiner

ACTUATING DRIVE FOR ADJUSTING THE PITCH ANGLE OF A ROTOR BLADE OF A WIND TURBINE, AND WIND TURBINE COMPRISING SUCH AN ACTUATING DRIVE

CROSS-REFERENCE TO RELATED APPLICATIONS

This application is a continuation of International Patent Application Number PCT/EP2019/055718 filed Mar. 7, 2019, which claims priority to German Patent Application Number DE 10 2018 107 172.8 filed Mar. 26, 2018, the contents of which are incorporated herein by reference in their entireties.

BACKGROUND

The present invention generally relates to wind turbines whose rotor blades can be adjusted with respect to their pitch angles. In this respect, the invention in particular relates to an actuating drive for adjusting the pitch angle of a rotor blade of a wind turbine having a large roller bearing that comprises two bearing rings that can be rotated with respect to one another and having an actuator for rotating the two bearing rings.

In modern wind turbines, the rotor blades are supported at the rotor hub respectively rotatably about the longitudinal rotor blade axis to be able to vary the pitch angle of the rotor blades in dependence on the wind speed. This pitch angle, that is the angle of inclination abut the longitudinal rotor blade axis, can here be set electrically, on the one hand, with an electric motor, a transmission, and a ring gear being attached with an electrical pitch adjustment. The pinion driven by the electric motor meshes with the ring gear to rotate the two bearing rings with respect to one another in this manner and to hereby set the pitch angle.

On the other hand, it is known to set the pitch angle hydraulically. One or two hydraulic cylinders are provided here that are supported at the hub or at the bearing ring that is connected to the hub, with the piston rods being eccentrically connected to a disk that is connected to the rotor blade via the second bearing ring so that a rotation of the two bearing rings and thereby a setting of the pitch angle is achieved by retracting and extending the piston rod.

Since such actuating drives for the setting of the pitch angle often remain in the same position over a longer time and hold the rotor blade at the once set pitch angle, the actuating drives are subject to special demands. Lubrication problems, for example, result with said electrical pitch adjustments since the pinion frequently does not move with respect to the ring gear for a longer time and cannot distribute lubricant.

With said hydraulic pitch adjustments, the adjustment torque generated is typically not constant since the lever arm of the hydraulic cylinder or its piston rod varies with the pivot angle On the other hand, the cylinder force in such hydraulic cylinders is dependent on the direction since the piston surface and the piston rod surface have different sizes. It has already been considered to this extent to correspondingly control the hydraulic pressure for the compensation of the different adjustment forces, which is, however, very complex and/or expensive.

It is the underlying object of the present invention to provide an improved wind turbine as well as an improved actuating drive for the pitch angle of the rotor blade of such a wind turbine which avoid disadvantages of the prior art and further develop the latter in an advantageous manner. A low maintenance actuating drive of compact size should in particular be provided for the pitch angle that can achieve constant adjustment torques of equal amounts independently of the direction without requiring a complex and/or expensive pressure control therefor.

SUMMARY

In accordance with the invention, said object is achieved by an actuating drive in accordance with claim 1 and by a wind turbine in accordance with claim 12. Preferred embodiments of the invention are the subject of the dependent claims.

It is therefore proposed to integrate the actuating drive in the large roller bearing and to relocate the piston of the actuating drive into the interior of one of the bearing rings so that the piston can be adjusted on an arcuate trajectory and thus without changing the lever arm. In accordance with the invention, the actuating drive comprises an annular groove cylinder that is formed in one of the bearing rings and at least one piston that is displaceably received in the annular groove cylinder and that is drive-wise connected to the other one of the two bearing rings. If the piston in the annular groove cylinder is pressurized by pressure medium, the piston travels in the annular groove cylinder of the one bearing ring and in so doing takes along the other bearing ring via said drive-wise connection so that a rotation of the two bearing rings and thus an adjustment of the pitch angle occurs. In this respect, not only the lever arm of the piston and thus the generated torque remains constant, but the piston can also have piston surfaces of the same size on oppositely disposed sides so that the same actuating force and thus the same adjustment torque is generated independently of the direction.

A plurality of pistons can advantageously be provided and can be respectively received in an annular groove cylinder, with the plurality of pistons being able to be drive-wise connected to the respective other bearing ring. Relatively high actuating forces can be generated by such a plurality of pistons with relatively small piston diameters.

To have a particularly compact design, the plurality of pistons can be received in the same annular groove cylinder or in different sections of the common annular groove cylinder. The sections of the annular groove cylinder can here be separated from one another by partition walls so that the pressure that displaces the piston can be supported at the partition walls.

It would, however, alternatively also be possible to also provide a plurality of annular groove cylinders in one bearing ring or also in both bearing rings so that every piston or every piston group has its own annular groove cylinder. In the sense of a simple, compact, and space saving construction, one annular groove cylinder can, however, be sufficient in which a plurality of pistons can run.

The two bearing rings of the large roller bearing are advantageously supported with respect to one another by at least two axial roller bearing rows, with the axial roller bearing rows advantageously being able to be arranged on oppositely disposed sides of an annular section or of an annular nose so that the two bearing rings are supported with respect to one another in both axial directions, i.e. with an upright arrangement of the axis of rotation of the bearing, the one bearing ring is supported both downwardly and upwardly at the other bearing ring. The one bearing ring can so-to-say be clamped between the two axial roller bearings.

In an advantageous further development of the invention, the at least one annular groove cylinder can be arranged— viewed in cross-section of the large roller bearing—at least partially between the two axial roller bearing rows. With an upright arrangement of the bearing axis of rotation, the one axial bearing can be arranged above the annular groove cylinder and the other axial roller bearing can be arranged beneath the annular groove cylinder. In this respect, a cross-sectional overlap can also be provided between the axial roller bearings, on the one hand, and the annular groove cylinder, on the other hand. If, viewed in cross-section, a straight line is placed through the annular groove cylinder that extends in parallel with the bearing axis of rotation, said straight line impinges at least one of said axial bearings.

On the other hand, a certain diameter offset can by all means be sensible between the axial bearings, on the one hand, and the annular groove cylinder, on the other hand. If the mean diameters of the axial roller bearing rows and of the annular groove cylinder are looked at, they can have dimensions of different sizes, for example such that the mean diameter of the annular groove cylinder approximately corresponds to the outer diameter of the axial roller bearing rows or to the inner diameter of the axial roller bearing rows, depending on whether the annular groove cylinder is provided in the inner ring or in the outer ring.

In a further development of the invention, the annular groove cylinder can be formed in the outer ring. It would, however, generally also be possible to provide the annular groove cylinder in the inner ring.

The two aforesaid axial roller bearings can have substantially the same diameters.

In addition to said axial roller bearings, the two bearing rings can advantageously also be supported with respect to one another by at least one radial roller bearing row, with said radial roller bearing row advantageously being able to be arranged between the two axial roller bearing rows.

Said at least one radial bearing can in particular be arranged in a diameter region over which a driver extends by which the at least one piston is connected to the other bearing ring.

The bearing ring comprising the annular groove cylinder can advantageously be formed as divided into two or more, with the annular groove cylinder being able to be formed in the region of the separation plane or separation area between the two bearing ring parts so that the separation plane or separation area so-to-say passes through the annular groove cylinder. Said bearing ring can in particular be divided in a plane substantially perpendicular to the axis of rotation of the large roller bearing.

The aforesaid driver can extend substantially radially from the annular groove cylinder starting from the bearing ring to be drive-wise connected to the other bearing ring. If the annular groove cylinder is provided in the outer ring, said driver can extend radially inwardly toward the inner ring.

To seal the annular groove cylinder, different seals can be provided between the two bearing ring parts. A static seal can in particular be provided on one side of the annular groove cylinder, while one or more slide seals can be provided on another side of the annular groove cylinder that seal the bearing ring parts with respect to said driver.

Said seals can advantageously be designed as working axially, i.e. can press onto the radially extending sealing surfaces in an axial direction.

BRIEF DESCRIPTION OF THE DRAWINGS

The invention will be explained in more detail in the following with reference to a preferred embodiment and to associated drawings. There are shown in the drawings.

DETAILED DESCRIPTION

Figure 1:
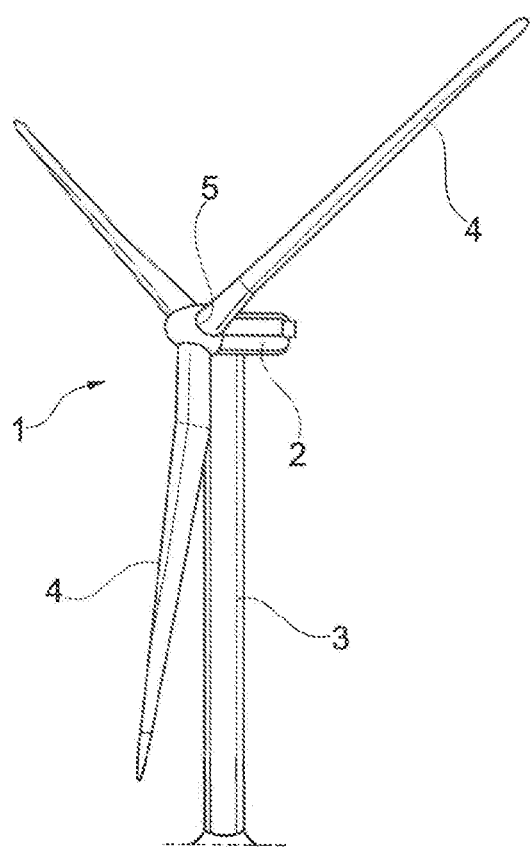
FIG. 1: a schematic front view of a wind turbine at whose rotor hub a plurality of rotor blades are arranged that are adjustable with respect to their pitch angles.

The wind turbine 1 shown in FIG. 1 can comprise in a manner known per se a tower 3 on which a nacelle 2 is arranged rotatably about an upright axis. The generator and other system components can be accommodated in said nacelle 2.

A plurality of rotor blades 4 are arranged at the rotor hub and are supported at said rotor hub rotatably about their longitudinal axes, i.e. variably in their pitch angles.

Figure 2:
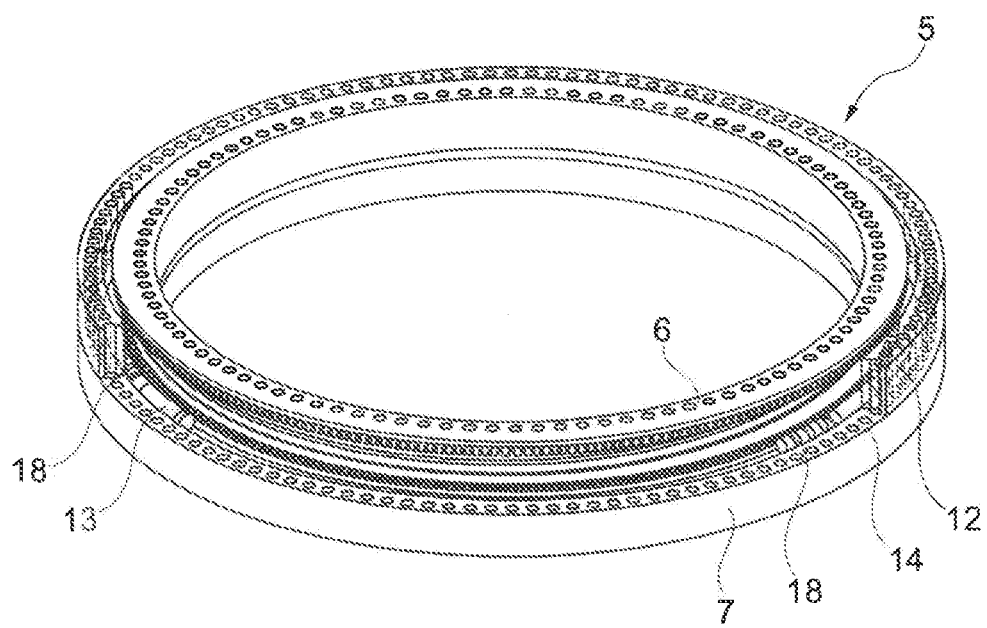
FIG. 2: a perspective representation of the large roller bearing by which a rotor blade is rotatably supported at the rotor hub and of the actuating drive integrated in the bearing rings to adjust the pitch angle.
Figure 3:
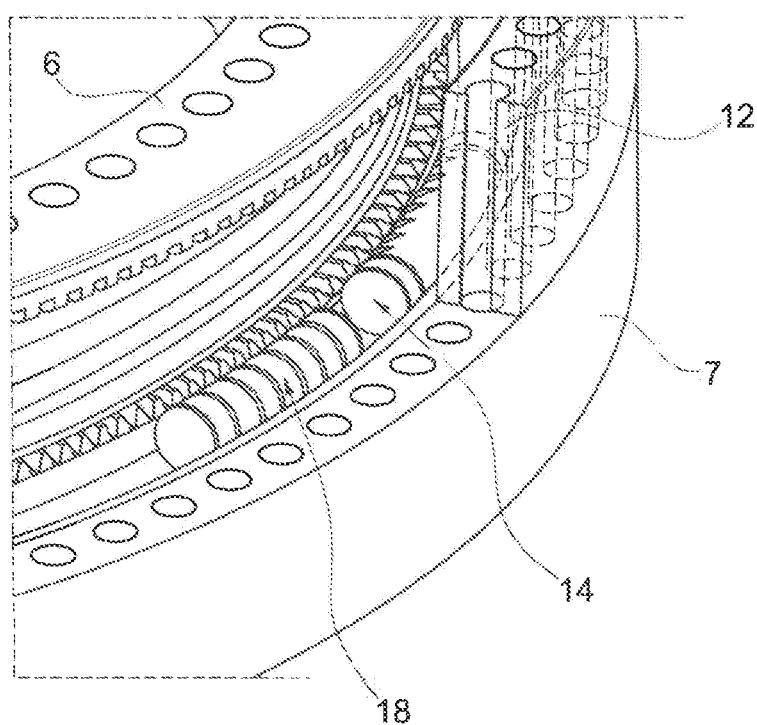
FIG. 3: a sectional, perspective representation of the actuating drive of FIG. 2 that shows the annular groove cylinder and the piston displaceable therein in one of the bearing rings.
Figure 4:
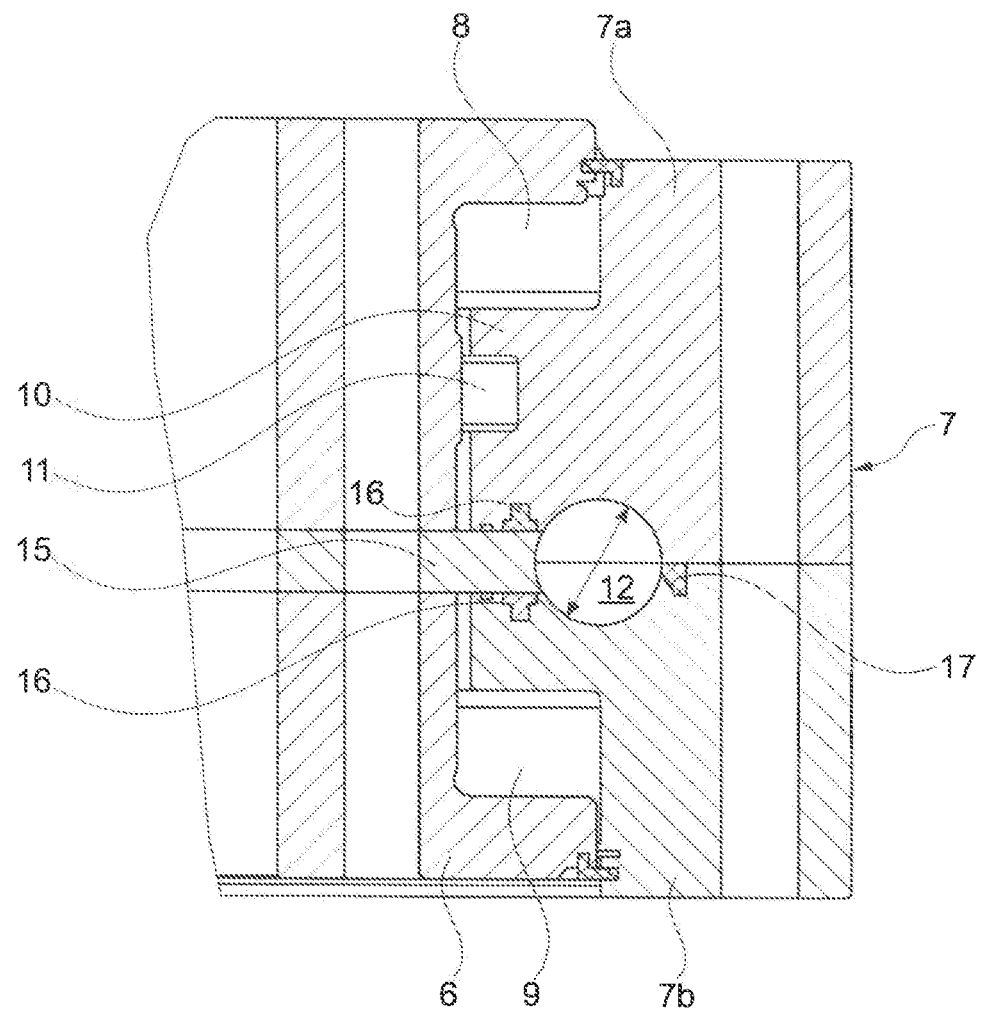
FIG. 4: a sectional view of the actuating drive of the preceding Figures through the two bearing rings of the large roller bearing that shows the arrangement of the roller bearing rows and of the annular groove cylinder as well as of the seals for sealing the annular groove cylinder.

Said rotor blades 4 are here supported at the rotor hub by a large roller bearing such as is shown in FIGS. 2-4.

The large roller bearing 5 comprises two bearing rings 6 and 7 that are arranged concentrically toward one another and are rotatable with respect to one another.

The one bearing ring is here fixedly connected to the rotor blade 4 while the other bearing ring is fastened to the rotor hub.

As in particular FIG. 4 shows, the two bearing rings 6 and 7 can be supported rotatably with respect to one another by a plurality of roller bearing rows. On the one hand, two axial roller bearing rows 8 and 9 are advantageously provided here that can, for example, be formed as cylinder roller bearings.

The two axial roller bearing rows 8 and 9 support the two bearing rings 6 and 7 at one another in opposite directions. One of the bearing rings—for example the bearing ring 7—can in particular have an annular nose 10 that projects toward the other bearing ring 6 and that is axially clamped at the other bearing ring 6 by the two axial roller bearing rows 8 and 9 or is supported in opposite directions. The other bearing ring 6 can have an annular groove for this purpose into which said annular nose 10 engages.

The two bearing rings 6 and 7 can furthermore be supported with respect to one another by at least one radial roller bearing row 11 that can, for example, likewise be configured as a cylinder roller bearing.

Multi-row roller bearings can also be provided instead of the shown single-row roller bearings.

As FIG. 4 shows, the radial roller bearing 11 can advantageously be arranged between the two axial roller bearings 8 and 9, in particular in the gap between the aforesaid annular nose 10 and the annular groove accommodating the annular nose 10.

As FIGS. 2-4 show, one of the bearing rings, in particular the outer bearing ring 7, can be provided with an annular groove cylinder 12 that extends arcuately in the interior of the bearing ring 7 and forms a pressure medium cylinder in which one or more pistons 13, 14 are displaceably received. As FIG. 3 shows, the piston 13 and 14 can likewise be slightly arcuately curved to be able to slide smoothly and without resistance along the arcuately curved annular groove cylinder contour.

As FIG. 4 shows, the bearing ring 7 having the annular groove cylinder 12 can be formed divided into two or more parts, with the separation plane being able to extend through the annular groove cylinder 12. The annular groove cylinder 12 is not fully closed toward the other bearing ring 6, but a radially extending gap is rather provided in which a driver 15 is arranged that extends from the annular groove cylinder 12 starting from the bearing ring 7 toward the other bearing ring 6. Said driver 15 can be formed in disk shape and can be seated with an exact fit in the gap between the two bearing ring parts 7a and 7b so that the annular groove cylinder 12 can also be inwardly sealed by the driver 15.

As FIG. 4 shows, sliding seals 16 that seal the bearing ring parts 7a and 7b toward said driver 15 can be provided at the two bearing ring parts 7a and 7b. A static seal 17 that seals the annular groove cylinder 12 in the separation plane of the two bearing ring parts 7a and 7b can furthermore be provided on another side of the annular groove cylinder 12.

Said seals 16 and 17 can be formed as working axially and can develop their sealing effect when the two bearing ring parts 7a and 7b are axially tensioned with respect to one another, for example by corresponding clamping bolts.

As FIG. 3 shows, separation pistons 18 or partition walls that divide the annular groove cylinder 12 into a plurality of annular groove cylinder sections are furthermore seated in the annular groove cylinder 12. The pressure that serves the traveling of the pistons 13 and 14 is supported with respect to said separating pistons 18.

Said separation pistons 18 can advantageously be provided with a pressure medium feed and/or a pressure medium outlet to be able to introduce and drain pressure medium into and out of the sections of the annular groove cylinder.

If, for example, pressure medium is supplied into the right chamber toward the piston 14 via the separation piston 18 that is shown in FIG. 3, said piston 14 travels counterclockwise. In so doing, it takes along the inner ring 6 via the driver 15 so that the two bearing rings 6 and 7 are rotated with respect to one another.

We claim:

1. An actuating drive for adjusting a pitch angle of a rotor blade of a wind turbine having a roller bearing comprising:
    a first bearing ring and a second bearing ring rotatable with respect to one another, wherein the first and second bearing rings are supported with respect to one another by at least one radial roller bearing row, wherein the first bearing ring has an annular nose that radially projects into an annular groove in the second bearing ring;
    an actuator for rotating the first and second bearing rings with respect to one another;
    an annular groove cylinder formed in the annular nose of the first bearing ring; and
    at least one piston displaceably received in the annular groove cylinder and drive-wise connected to the second bearing ring,
    wherein the at least one radial roller bearing row is in a diameter region over which a driver extends that connects the at least one piston to the second bearing ring.

2. The actuating drive of claim 1, wherein two or more pistons are displaceably received in the annular groove cylinder and are each drive-wise connected to the second bearing ring.

3. The actuating drive of claim 1, further comprising two axial roller bearing rows, wherein the first and second bearing rings are supported with respect to one another by the two axial roller bearing rows, with, considered in cross-section, the at least one piston being at least partially arranged between the two axial roller bearing rows.

4. The actuating drive of claim 3, wherein the annular groove cylinder and the two axial roller bearing rows define mutually overlapping diameter regions.

5. The actuating drive of claim 1, further comprising two axial roller bearing rows, wherein the at least one radial roller bearing row is between the two axial roller bearing rows.

6. The actuating drive of claim 1, wherein the first bearing ring is formed as divided into two or more parts and the annular groove cylinder is formed in the region of a separation plane or a separation area between the two or more parts of the first bearing ring.

7. The actuating drive of claim 6, wherein the two or more parts of the first bearing ring are sealed on a first side of the annular groove cylinder by a static seal and are sealed on a second side of the annular groove cylinder by a sliding seal with respect to the driver, and wherein the driver is connected to the at least one piston.

8. The actuating drive of claim 7, wherein the static seal and/or the sliding seal is/are formed to act axially.

9. The actuating drive of claim 1, wherein the at least one piston is rigidly connected to the second bearing ring by the driver, and wherein the driver comprises a radially extending annular driver plate.

10. A wind turbine comprising:
    a rotor having a plurality of rotor blades, wherein the rotor blades are each fastened to a rotor hub of the rotor by the actuating drive of claim 1 are adjustable with respect to their pitch angles.

11. An actuating drive for adjusting a pitch angle of a rotor blade of a wind turbine having a roller bearing comprising:
    a first bearing ring and a second bearing ring rotatable with respect to one another, wherein the first and second bearing rings are supported with respect to one another by at least one radial roller bearing row;
    an actuator for rotating the first and second bearing rings with respect to one another;
    an annular groove cylinder formed in the first bearing ring, wherein the first bearing ring is divided into two ring sections along a plane extending perpendicular to an axis of rotation of the roller bearing, wherein the annular groove cylinder is formed in a region of the plane which passes through the annular groove cylinder; and
    at least one piston displaceably received in the annular groove cylinder and drive-wise connected to the second bearing ring, wherein the at least one radial roller bearing row is in a diameter region over which a driver extends that connects the at least one piston to the second bearing ring,
    wherein a static seal on a first side of the annular groove cylinder seals the two ring sections against each other, wherein a pair of sliding seals on a second side of the annular groove cylinder seal each of the two ring sections against the driver, wherein the driver has a disc shape and extends through a radially extending gap between the two ring sections, and wherein the two ring sections are axially tensioned towards each other such that the static seal and the pair of sliding seals work axially.

12. An actuating drive for adjusting a pitch angle of a rotor blade of a wind turbine having a roller bearing comprising:
- a first bearing ring and a second bearing ring rotatable with respect to one another, wherein the first and second bearing rings are supported with respect to one another by at least one radial roller bearing row;
- an actuator for rotating the first and second bearing rings with respect to one another;
- an annular groove cylinder formed in an annular nose of the first bearing ring; and
- a piston displaceably received in the annular groove cylinder and drive-wise connected to the second bearing ring, wherein the at least one radial roller bearing row is in a diameter region over which a driver extends that connects the piston to the second bearing ring,
- wherein the annular nose radially extends into an annular groove in the second bearing ring, wherein the first and second bearing rings are supported relative to each other by a pair of axial roller bearings arranged on opposite sides of the annular nose in a gap between the annular nose and the annular groove, wherein a radial bearing is in the gap between the annular nose and the annular groove, wherein the radial bearing is between the two axial roller bearings, and wherein the driver has a disc shape and radially extends out of the annular nose through a gap in the annular nose that opens towards the second bearing ring.

* * * * *